(12) United States Patent
Reeves

(10) Patent No.: US 7,104,430 B2
(45) Date of Patent: *Sep. 12, 2006

(54) BICYCLE RACK

(75) Inventor: Michael K. Reeves, Woodinville, WA (US)

(73) Assignee: Sportworks Northwest, Inc., Woodinville, WA (US)

( * ) Notice: Subject to any disclaimer, the term of this patent is extended or adjusted under 35 U.S.C. 154(b) by 192 days.

This patent is subject to a terminal disclaimer.

(21) Appl. No.: 10/313,974

(22) Filed: Dec. 5, 2002

(65) Prior Publication Data

US 2003/0209582 A1    Nov. 13, 2003

Related U.S. Application Data

(63) Continuation of application No. 08/922,347, filed on Sep. 3, 1997, now abandoned, which is a continuation of application No. 08/406,095, filed on Mar. 16, 1995, now Pat. No. 5,692,659.

(51) Int. Cl.
*B60R 9/00* (2006.01)
*B60R 9/06* (2006.01)

(52) U.S. Cl. ............... 224/536; 224/537; 224/525; 224/518; 224/504; 224/924

(58) Field of Classification Search ......... 224/282, 224/488, 495, 533, 536, 537, 924, 525, 518, 224/504; 211/5, 17, 19, 20, 22, 23
See application file for complete search history.

(56) References Cited

U.S. PATENT DOCUMENTS

| | | | |
|---|---|---|---|
| 488,395 A | 12/1892 | Justice | |
| 529,827 A | 11/1894 | Fonda | |
| 556,789 A | 3/1896 | Walker | |
| 576,351 A | 2/1897 | Penfield | |
| 586,681 A | 7/1897 | Douglas | |
| 607,024 A | 7/1898 | Durfee et al. | |
| 615,264 A | 12/1898 | DuPont | |
| 623,807 A | 4/1899 | Myers | |
| 1,179,823 A | 4/1916 | Greene | |
| 3,744,689 A | 7/1973 | Kjensmo | |
| 3,853,255 A * | 12/1974 | Spencer | 224/537 |
| 3,861,533 A * | 1/1975 | Radek | 211/20 |
| 4,171,077 A | 10/1979 | Richard, Jr. | |
| 4,213,729 A | 7/1980 | Cowles | |
| 4,386,709 A * | 6/1983 | Graber | 211/20 |
| 4,392,572 A * | 7/1983 | Bernard | 211/19 |
| 4,403,716 A | 9/1983 | Carlson et al. | |
| 4,437,597 A | 3/1984 | Doyle | |

(Continued)

FOREIGN PATENT DOCUMENTS

SE          97617    * 12/1939    ......... 224/42.03 B (Continued)

OTHER PUBLICATIONS

Mobilus 1 st Generation Stowed (Color Photo).

(Continued)

*Primary Examiner*—Tri M. Mai
(74) *Attorney, Agent, or Firm*—Dorsey & Whitney, LLP

(57) ABSTRACT

A rack for securing wheeled vehicles, particularly bicycles, includes wheel-receiving wells for receiving the front wheel of the vehicle and contacting the wheel at least at two points. A wheel-engaging arm, pivotally mounted to the rack, is pivoted upwardly and is extensible outwardly against a biasing element. The arm is adapted to engage the wheel of the bicycle at least at a third point for securely holding the vehicle.

3 Claims, 4 Drawing Sheets

U.S. PATENT DOCUMENTS

| | | | | |
|---|---|---|---|---|
| 4,524,893 A | * | 6/1985 | Cole | 224/319 |
| 4,702,401 A | | 10/1987 | Graber et al. | |
| 4,815,638 A | * | 3/1989 | Hutyra | 224/525 |
| 4,823,997 A | | 4/1989 | Krieger | |
| 4,875,608 A | | 10/1989 | Graber | |
| 5,029,740 A | | 7/1991 | Cox | |
| 5,169,042 A | | 12/1992 | Ching | |
| 5,238,125 A | * | 8/1993 | Smith | 211/5 |
| 5,246,120 A | * | 9/1993 | Walker | 211/19 |
| 5,984,111 A | * | 11/1999 | Pennella | 211/5 |

FOREIGN PATENT DOCUMENTS

SE    104714    6/1942

OTHER PUBLICATIONS

Mobilus 1st Generation (Color Photo).
Mobilus 2nd Generation Deployed (Color Photo).
Mobilus 2nd Generation Stowed (Color Photo).
Mobilus 2nd Generation With Arm Up (Color Photo).

* cited by examiner

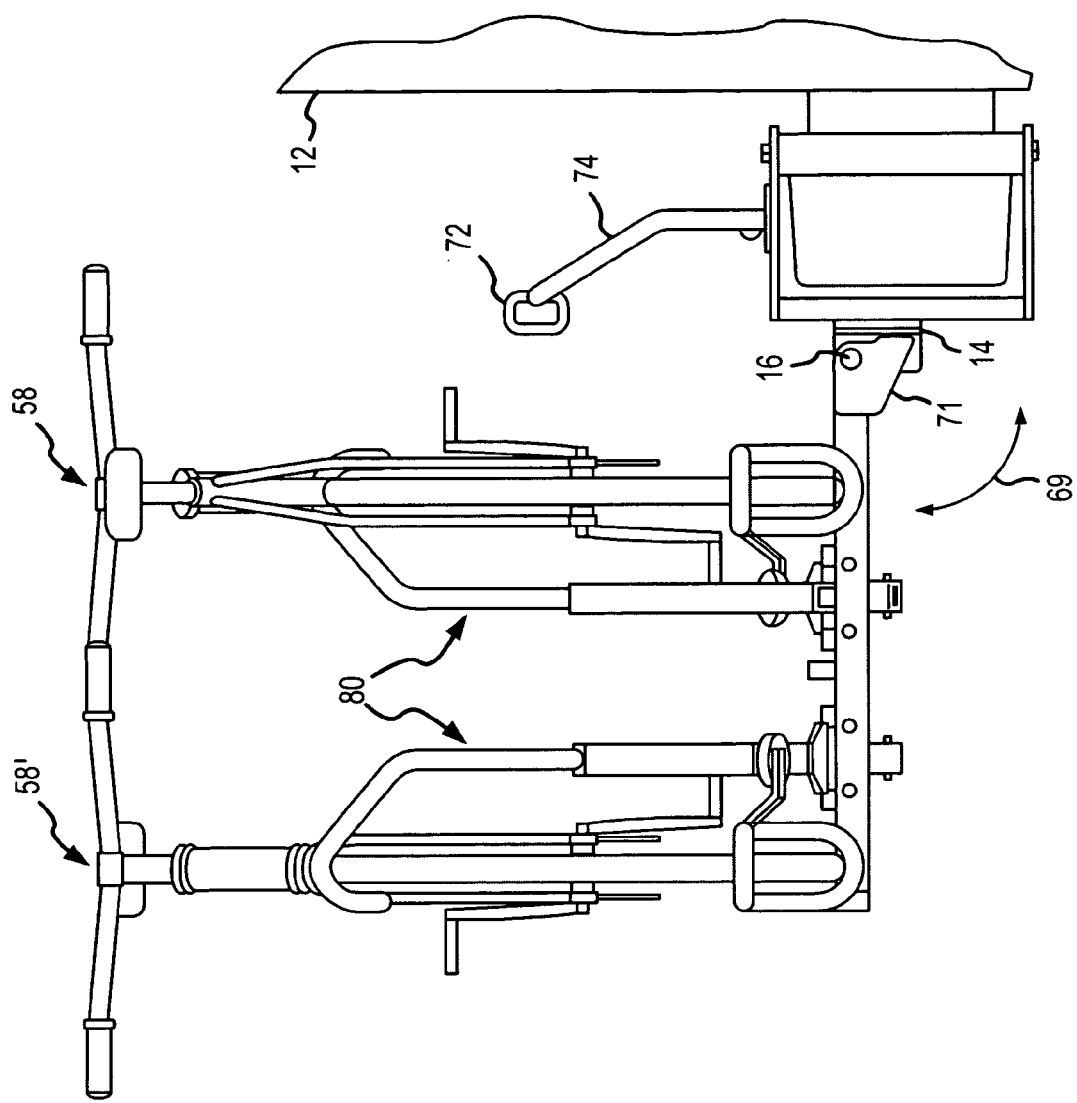
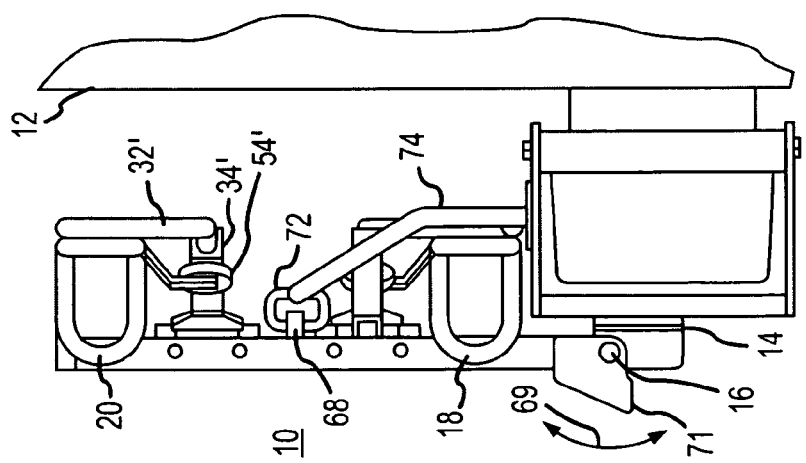
FIG. 6
FIG. 5

BICYCLE RACK

CROSS-REFERENCE TO RELATED APPLICATIONS

This is a Con. of Ser. No. 08/922,347, Sep. 3, 1997, ABN, which is a Con. of Ser. No. 08/406,095, Mar. 16, 1995, now U.S. Pat. No. 5,692,659.

This invention relates to racks for carrying two-wheeled vehicles and more particularly to a bicycle rack adapted for use in conjunction with public transit vehicles.

BACKGROUND OF THE INVENTION

To reduce traffic congestion and pollution from automobile exhaust, transit authorities are continually searching for ways to enhance transit system ridership. One way to enhance such ridership is to encourage bicycle riders to use public transportation for long-haul portions of their trips and to rely on their bicycles for short trips at either end of their transit system travel. Encouraging such bicycle use will cause greater numbers of transit system users to leave their cars behind and the result will be reduced pollution and traffic congestion. Passengers may be more inclined to use mass transit if they know that they will still be able to travel moderate distances relatively easily at either end of their transit ride, without having to further wait for connecting vehicles. Transit travel is further enhanced by having a bicycle available when further travel is to areas near transit lines but not directly served thereby.

However, transporting a bicycle on the transit vehicle is a problem. At periods of low ridership, it is relatively straightforward to bring a bicycle onto a bus or train, since there is ample room to accommodate both the rider and the bicycle. However, during peak hours, busses or trains are typically filled to capacity and therefore, bringing a bicycle on board is difficult if not impossible. A bicycle brought on board during peak hours can impede the entry and exit of other passengers. Further, once the bicycle is on board, if large numbers of passengers board later, it can be difficult for the bicycle rider to exit at a desired stop without injuring other passengers.

To alleviate such problems, some transit systems have banned bike riders during peak hours. However, such a ban defeats the goal of increasing ridership and encouraging bicyclists to use the system. Therefore, transit systems have employed bicycle racks in conjunction with busses or trains wherein the bicycle racks are attached externally to the vehicle. With some externally mounted bike racks, the bus driver or train operator must load the bike for the rider. In cases where the bus operator loads the bike, transit system efficiency is reduced since time is required for the transit operator to leave his operating position to assist with loading the bicycle onto the bike rack after having previously secured the vehicle to prevent undesired movement. Some systems employ racks where the riders must load the rack themselves without assistance from the driver. Such racks have heretofore been difficult to load, requiring a rider to set the bicycle aside and use both hands to bring the rack into a loading position. Only then could the rider pick up the bicycle and place it in the rack. When more than one bike was loaded onto the rack, it became difficult to add additional bikes as other bicycle riders board the transit system. Further, with more than one bike on a rack, it is difficult to remove bikes held at the rear of the rack, typically requiring the removal of all the bikes in front of the rear bike. Then, the other bikes, whose owners are not leaving the transit system at that particular stop point, would have to be reloaded onto the rack. Often, bicycle riders are required to sit near the front of the bus in order to be able to disembark and move their bicycles out of the way of bicycles at the back of the rack. Such extra unloading and loading undesirably lengthens the time required at that particular transit stop, which can lead to passenger frustration and difficulty in maintaining scheduling of subsequent stops.

Heretofore, bicycle racks for mounting to transit vehicles have employed relatively elongated members which extended a substantial distance from the transit vehicle. However these elongate members are typically small in cross section relative to their length, and might result in unintended collision between the elongate members of the rack and other objects when no bicycles are mounted thereon, since the transit vehicle operator or persons driving near the transit vehicle might not see the elongate member. Such unintentional collisions could damage the rack, the bus, the bicycles or the object collided with. If the rack was made to fold up when not in use, it has heretofore been necessary to have the transit operator lower the rack prior to loading, or if the rack is lowered by the riders, the operation required excessive expenditure of time.

Bicycle racks according to the prior art have secured the bicycles to the racks by use of straps or clamps or other means that caused chipping of the paint on the bicycles, leading to rider dissatisfaction.

Automated washing of vehicles with prior art racks mounted thereon can become a problem. Frequently the racks become entangled with the washing apparatus, requiring the halting of the washing process and operator intervention to untangle the rack. It therefore becomes necessary to remove the rack from the vehicle prior to washing.

SUMMARY OF THE INVENTION

In accordance with the present invention a rack for securing a wheeled vehicle, for example a bicycle, includes a wheel receiving means that contacts a wheel of the bicycle at least at first and second points. An engaging means for contacting the wheel at a third point is also provided, thereby engaging the bicycle's wheel at least at three points thereof. The engaging means can comprise an extensible arm hingedly mounted to a frame and which is adapted to extend up over the wheel to engage the wheel at an upper point thereof. The extensible arm is retained in a stored position by a retaining means until such time as the arm is extended by a user. The rack is suitably hingedly attached to a support, i.e., a transit vehicle and includes a latch means for maintaining the frame in a stowed position relative to the support.

It is accordingly an object of the present invention to provide an improved bicycle rack.

It is a further object of the present invention to provide an improved bicycle rack which is well adapted for use with mass transit vehicles.

It is an additional object of the present invention to provide an improved bicycle rack that is easily stowed in an upright position but which is also easily operated by unskilled or first-time users.

It is a further object of the present invention to provide an improved bicycle rack that enables multiple bicycles to be carried thereon while allowing easy removal of one bike without requiring removal of another.

A further object of the present invention is to provide an improved bicycle rack that does not chip or mark the paint on the bicycle.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 5 is an end view of the bicycle rack in the stowed position against the front of a bus; and FIG. 6 is an end view of the bicycle rack with two bicycles installed thereon.

DETAILED DESCRIPTION

Figure 1:
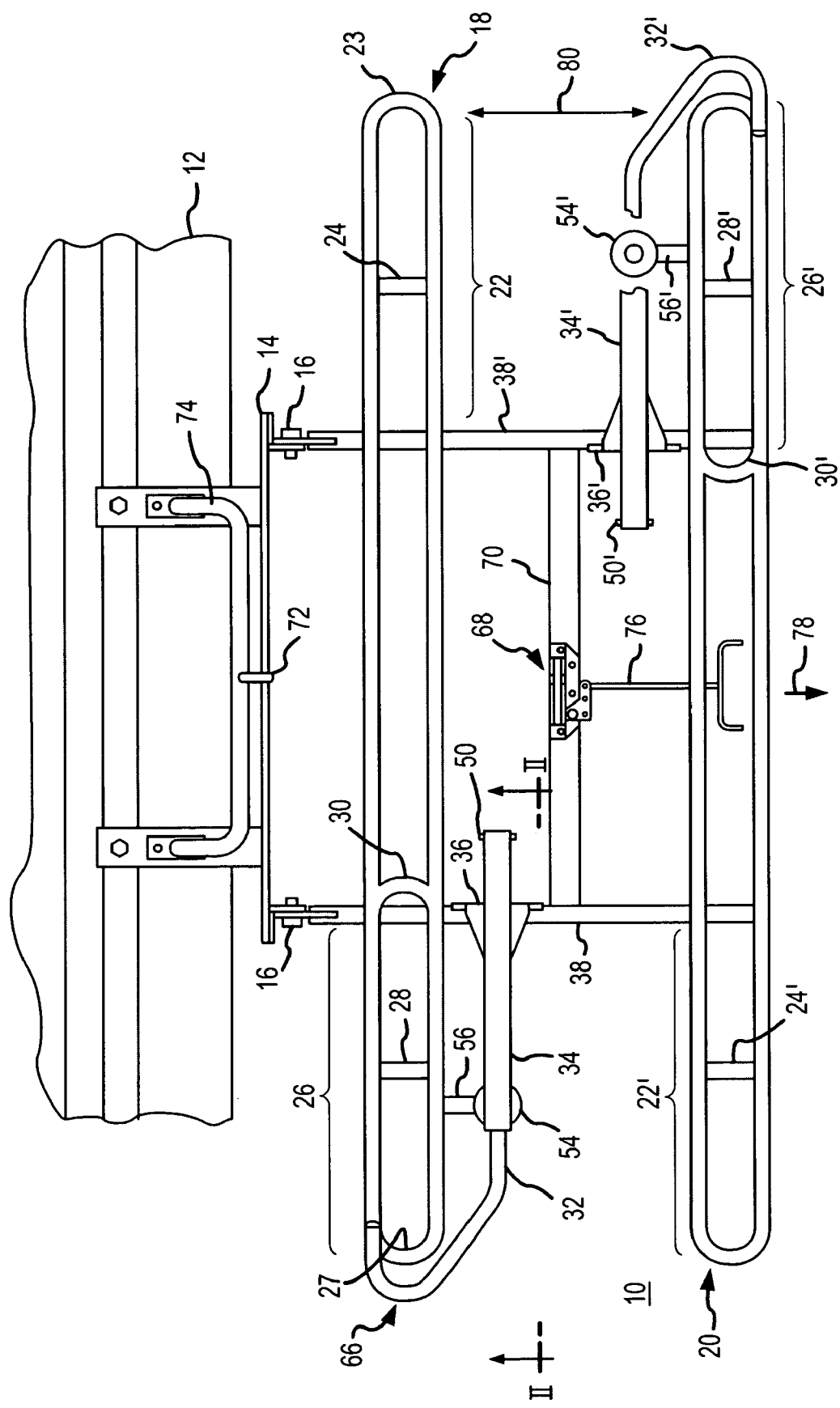
FIG. 1 is plan view of a bicycle rack in accordance with the present invention as mounted on the front of a bus.

Referring to the drawings and particularly to FIG. 1, a plan view of a bicycle rack according to the present invention as installed against a bus, the bicycle rack 10 is mounted to the front (or back) of the bus 12 (illustrated in cut-away fashion) via bracket 14, wherein the bracket 14 is connected to the bus with any suitable means. The rack comprises a frame having left and right cross members 38 and 38' which pivotally attach to bracket 14 via a pair of hinges 16 thereby allowing the rack to pivot from a stowed position, relatively parallel with the vertical plane of the bus, to a lowered position that is substantially perpendicular to the vertical plane of the bus. In FIG. 1, the rack is illustrated in the lowered position, and it may be observed that cross members 38 and 38' extend away from the front of the bus. The illustrated embodiment of the rack comprises two bicycle receiving portions 18 and 20 that are carried by cross arms 38 and 38'. The bicycle receiving portions are suitably relatively narrow in width in relation to their length, and are typically chosen to be of a length slightly shorter than the front-to-back length of the longest bicycle to be carried in the rack.

Referring to bicycle receiving portion 18 in particular, the frame, which is formed of tubing, is shaped to provide a first wheel well 22 positioned at one end of the bicycle receiving member and further comprises a wheel stop 23 at the outer edge thereof, with a wheel support member 24 spanning the central open width of wheel well 22 at a distance somewhat less than the radius of a typical bicycle tire from the wheel stop 23. At the opposite end of bicycle receiving portion 18 is a second wheel well 26 comprising a wheel stop 27 and a wheel support member 28, wherein wheel support member 28 is suitably positioned somewhat less than the radius of a typical bicycle tire away from the stop 27 toward the center of wheel well 26. A second wheel stop member 30 is provided as a part of wheel well 26 in opposite relation to wheel stop 27 such that wheel support member 28 is approximately equidistant from wheel stops 27 and 30.

Referring further to FIG. 1, the bicycle rack includes an extensible arm 32 received by arm base member 34 and mounted to bicycle frame cross member 38 via arm base member 34. Base member 34 is pivotally mounted to bicycle frame cross member 38 by double-leaf hinge member 36. Hinge member 36 and the arm base member 34 are joined such that arm base 34 extends a distance either side of the hinge member, but to a greater extent toward arm 32.

Figure 2:
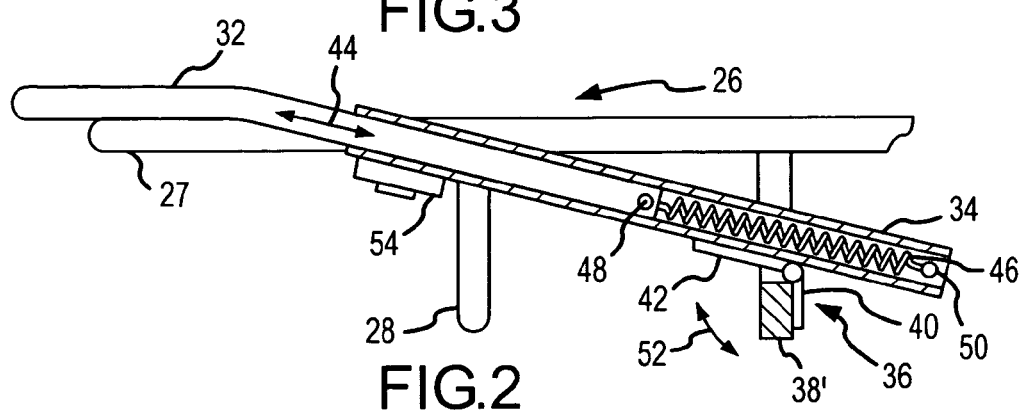
FIG. 2 is a sectional view taken along line II—II of FIG. 1 illustrating the internal structure of the extensible arm.

Referring now to FIG. 2, which is a cross sectional view taken along line II—II of FIG. 1, the interior construction of the arm 32 and base member 34 and the engagement with the hinge 36 and rack cross member 38 will be described in further detail. As may be observed in FIG. 2, the hinge member 36 is suitably supported by the cross member 38, with a first leaf 40 of the hinge being secured to the cross member (for example, by welding). A second leaf 42 of the hinge member is mounted to the arm base 34. The engagement position between hinge leaf 42 and arm member 34 is located somewhat off center from the longitudinal center of the arm base 34, such that a greater extent of arm 34 is disposed between the end of the arm base receiving arm 32 and hinge 36 than between the hinge and the opposite end of arm base 34.

Arm 32 is suitably received within arm base 34 in a sliding manner such that arm 32 may extend and contract relative to arm base 34, along the lines indicated by arrow 44. A biasing element 46, which in a preferred embodiment comprises a spring, is attached to the end of arm 32 that is contained within the interior of base 34. The biasing element is secured to arm 32 by a pin 48, while the distal end of the biasing element is held at the distal end of arm base member 34 via pin 50 (also visible in FIG. 1).

The biasing member 46 is operative to allow arm 32 to be extended outwardly from the interior of arm base 34, away from base pin 50, while providing a retracting force so as to cause the arm 32 to retract inwardly toward base pin 50 once arm 32 is released. The advantages provided by this arrangement will be described herewithin.

Referring to FIGS. 1 and 2 together, the bicycle rack also includes a retaining member 54 for maintaining the arm member in a close relationship with the rack when in a stowed position (the arm member is illustrated in the stowed position in both FIGS. 1 and 2). The retaining member 54 suitably comprises a magnet that engages arm base 34, wherein arm base 34 is constructed of a ferromagnetic material. Retaining member 54 mounts via mounting arm 56 to a portion of wheel well 26. The hinged arrangement between hinge member 36, cross member 38 and arm base 34 results in arm base 34 being rotationally movable along arc 52 (see FIG. 2), thereby allowing the arm base (and arm 32) to swing upwardly away from retaining member 54. Retaining member 54 also serves as a stop for defining the lower limit of movement of arm base 34 along arc 52.

Figure 3:
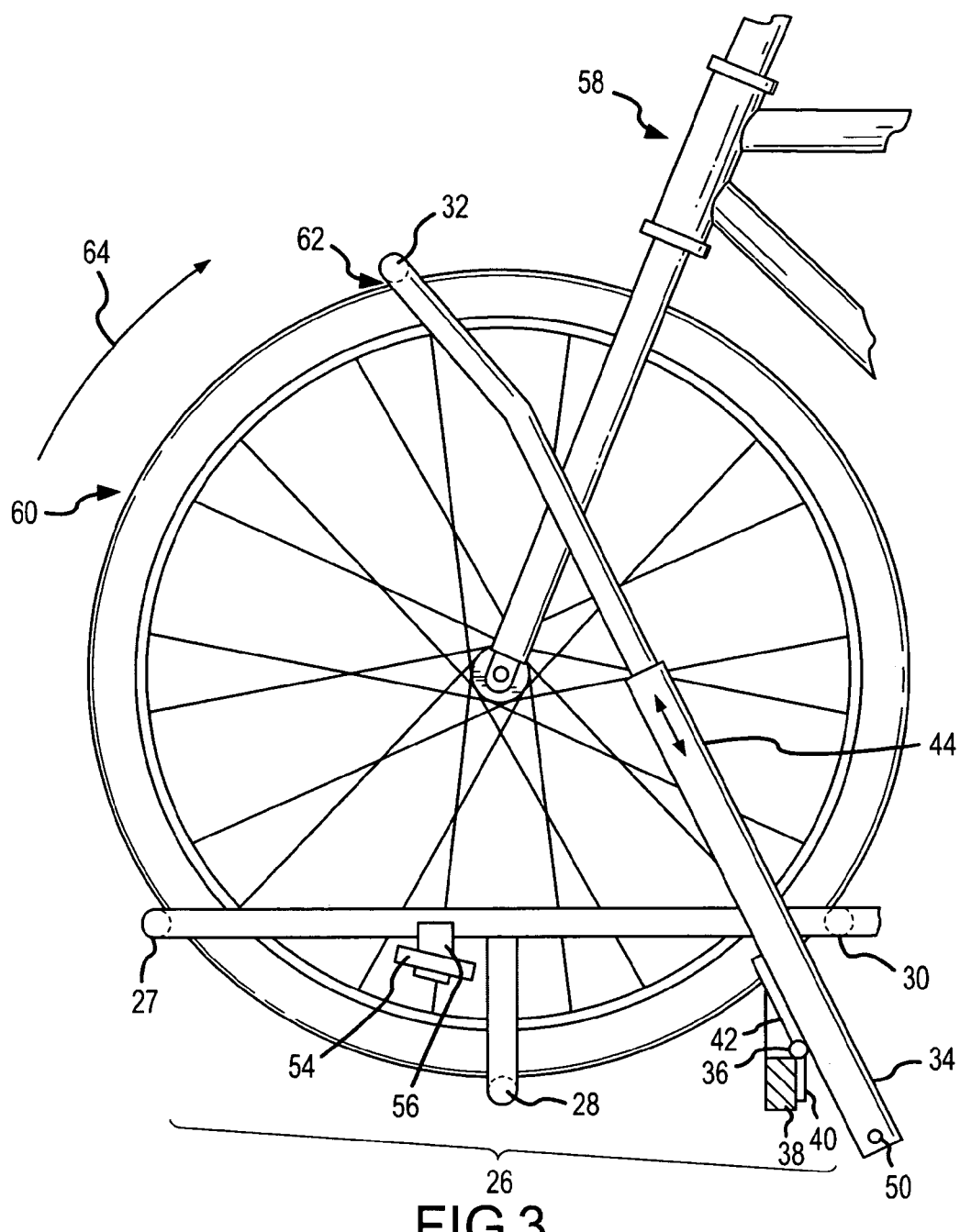
FIG. 3 is a partial side view of a bicycle rack of the present invention with a bicycle installed thereon, illustrating the engagement between the bicycle and the rack.

Referring now to FIG. 3, a partial side view of the bicycle rack according to the present invention with a bicycle installed thereon, the bicycle 58 is placed within the rack such that the bicycle is oriented in an upright position relative to the horizontal plane with the front wheel 60 placed within wheel well 26. The extensible arm portion 32 is then pulled outwardly along line 44 away from hinge point 36 a sufficient distance so as to allow the arm and arm base 34 to be pivoted upwardly along arc 64 so as to pass over the upper portion of the bicycle wheel. Once the extensible arm has been moved upwardly in the direction of arc 64 a sufficient distance so as to be positioned above point 62 on the tire of wheel 60, the arm 32 is then released so as to allow biasing element 46 to cause the arm to retract back within base 34 along line 44 toward pin 50, thereby bringing the upper part of arm 32 into firm engagement with the bicycle tire at point 62. The biasing element is sufficiently strong to provide bias to hold the arm in firm engagement with the tire, thereby securely holding the bicycle in the rack while still enabling a user to pull the arm away from the tire for unloading purposes. It may be observed from FIG. 3 that the bicycle tire is firmly held at least at three points to provide a secure engagement between the bicycle rack and the bicycle tire. In the particular illustration of FIG. 3, the engagement occurs at four points, namely at 27, 28, 30 and 62. However, depending on the size of the bicycle tire, not all of points 27, 28 and 30 will engage the bicycle wheel; a larger tire will contact the bicycle rack at points 27 and 30, while smaller tires will touch at points 28 and 30.

Figure 4:
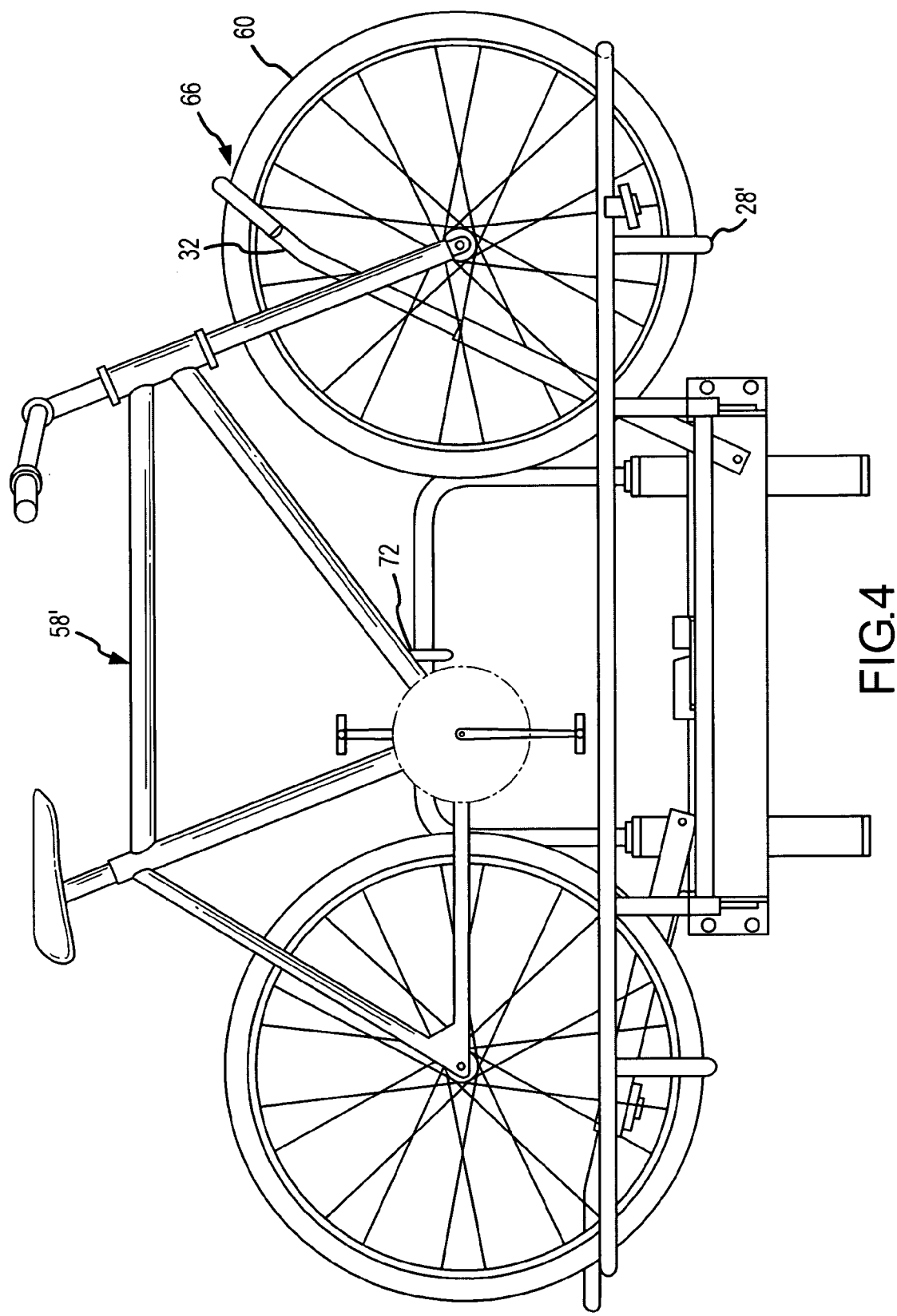
FIG. 4 is a side view of the rack with a bicycle installed thereon.

Referring to FIG. 1, it may be observed that arm 32 includes a J-hook portion 66 at the end distal from arm base 34. As visible in FIG. 4, a side view of the rack with a bicycle installed thereon, the J-hook portion 66 enables the arm member to loop over the top of the bicycle tire so the tire is substantially surrounded, thereby preventing lateral movement of the bicycle from disengaging the arm from the tire.

Referring again to FIG. 1, it may be observed that bicycle receiving portion 20 is substantially similar to bicycle receiving portion 18. However, the orientation of portion 20 is reversed in relation to that of receiving portion 18 such that the front wheel well 26' and engaging arm 32' of portion 20 are positioned at an opposite end of the bicycle rack relative to the placement of well 26 and arm 32 on portion 18. This opposing relation enables two bicycles to be mounted on the rack such that the front wheel of a first bicycle 58 is oriented in one direction when the bicycle 58 is loaded in portion 18 and the front wheel of a second bicycle 58' is oriented in the opposite direction when bicycle 58' is loaded in portion 20. The particular configuration of retaining member 54' may be observed in FIG. 1, wherein portions of arm base member 34' and arm 32' are cut away, illustrating the disc-like member 54'.

The rack 10 suitably includes a latch 68 which is mounted to the rack at a central cross member 70, where central cross member 70 extends between left and right members 38 and 38'. A striker pin 72 is positioned in relation to the frame of the vehicle 12 via mounting support 74 such that when the bicycle frame is pivoted upwardly along the rotational axis of the pivot hinges 16, latch 68 engages striker pin 72 thereby providing a secure holding force to maintain the rack in an upright or stowed position.

FIG. 5 is an end view of the rack 10 in the upright position wherein latch 68 has firmly engaged striker pin 72. The rack raises and lowers along arc 69, defined by the engagement of the rack 10, hinges 16 and brackets 14. Latch 68 is suitably a latch of the type known as a "slam latch". Referring again to FIG. 1, latch 68 includes a release arm 76. In use, when release arm 76 is pulled in the direction of arrow 78, the latch disengages from striker pin 72, thereby allowing the rack to pivot downwardly to a lowered, bicycle-receiving position.

It may further be observed in FIG. 5 that when the rack is in the upright position, the extensible arms 32 and 32' and their base members 34 and 34' are held securely in a stowed position against retaining members 54 and 54'. The arms are thereby prevented from swinging away from the rack and toward the bus, ensuring that the arms will not strike the front of bus 12 and cause damage thereto.

FIG. 6 is end view of the rack according to the present invention in its lowered position. The lower limit of pivoting of the rack is defined by a stop member 71 and its engagement with bracket 14. Two bicycles 58 and 58' are mounted on the rack and the alternate placement of the bicycle holding arms enables either bike to be easily mounted and removed from the rack, without interfering with an existing bike that may already be installed on the rack. Since the front wheels of the bicycles face in opposite directions, the handlebars of the bikes do not interfere with one another. The horizontal spacing between the two bicycle receiving portions along line 80 (also visible in FIG. 1) is such that a user may remove bicycle 58 from the rack without requiring removal of front bicycle 58'. This is particularly advantageous in transit system uses wherein the owner of the inner bicycle 58 may leave the transit vehicle and remove the bicycle 58 before the rider of bicycle 58' is ready to exit the transit system.

To load a bicycle on the rack, a rider approaches the rack and pulls downwardly on release 76 with one hand while continuing to hold the bicycle with the other hand. The rack is then allowed to lower to its loading position. Then, using both hands, the rider lifts up the bicycle and places it within either receiving portion 18 or 20, preferably with the front wheel of the bicycle in wheel well 26. Next, the rider lets go of the bicycle and pulls extensible arm 32 upwardly and outwardly so as to extend the arm up over the top of the front wheel. The arm may then be released and the action of biasing member 46 causes the arm to securely engage the tire. The loading process is thereby completed.

To remove a bicycle from the rack, the user merely steps up to the front wheel of the bicycle and pulls extensible arm 32 or 32' outwardly so as to disengage the J-hook portion thereof from the bicycle tire. The rider then lowers the arm along the arc 52 defined by pivot hinge 36 so as to cause arm base 34 to meet and be engaged by retaining member 54. The extensible arm is then released, whereupon the biasing element 46 causes the arm to retract to its stored position. The action of arm 32, arm base 34 and its pivot hinge 36 is such that the arm stows itself automatically via the force of gravity, i.e. once the user lets go of the arm, the arm falls downwardly and is engaged by retaining member 54. Once having released the front wheel of the bicycle from engagement with arm 32, the user lifts the bicycle up and out of the bicycle receiving portion 18 or 20 and lowers the bike to the ground. If the rider is the last one to remove a bike from the rack, the rider pushes the rack upwardly along the pivot range of hinges 16 until such time as latch 68 engages striker pin 72 and the rack is thus maintained in the stowed position of FIG. 5.

The bicycle rack is suitably constructed of tubing with rounded edges as illustrated so as to allow the rack to be mounted to the front of a bus, for example, while still allowing the bus to pass through conventional washing equipment without the rack becoming entangled therewith. Thus, it is relatively easy to wash the bus in a conventional manner without entangling the rack and damaging either the rack, the bus or the bus washing equipment. The relatively compact size of the rack enables the turning radius of transit vehicles to be maintained, since the rack does not extend a significant distance beyond the front or back of the transit vehicle.

It is therefore seen that the bicycle rack according to the present invention enables use of the rack in transit systems without route delay that might occur with the prior art, since the rack is easily loaded and unloaded even by first-time users. The rack is also advantageous in that it accommodates a variety of types and sizes of bicycles both with and without fenders, and since the rack engages the bicycle only on the tires, no marring or chipping of paint on the bicycle occurs. There are no straps or cords which engage the bicycle and which may become lost or which may harm the bicycle.

Further, the arrangement of the rack is such that the bicyclists can load and unload their bicycles from curbside, without requiring a rider to stand beyond the bus on the street side thereof, risking potential injury from a passing car.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

The invention claimed is:

1. A bicycle in combination with a bicycle rack in which the bicycle rack is adapted for mounting to a vehicle and the bicycle is secured to said bicycle rack via contact with the wheels of the bicycle, comprising:
   a frame including a wheel well for receiving a first wheel of the bicycle, the wheel well having an outer stop member and an inner stop member; and
   an extensible arm for engaging the first wheel of the bicycle, said extensible arm being pivotally mounted on a surface of the frame other than a surface on which the periphery of the first wheel rests at a location adjacent to said wheel well inwardly of the outer stop member and outwardly of the inner stop member so that the extensible arm projects upwardly at an angle toward one end of the bicycle, said extensible arm including a biasing mechanism to urge said extensible arm to a retracted position, whereby said extensible arm engages a tire of the first wheel and urges the bicycle downwardly to urge the tire of the first wheel into engagement with said wheel well and into engagement with at least one of said outer and inner stop members, thereby securing the bicycle to the rack.

2. The bicycle and rack combination of claim 1 further comprising a second wheel well, wherein said second wheel well has a depth such that when the second wheel of the bicycle sits within the second wheel well, an inner surface of a rim of the second wheel is below a top edge of the second wheel well.

3. The bicycle and rack combination of claim 1 wherein the first wheel of the bicycle comprises the front wheel of the bicycle.

* * * * *